3,358,063
**PROCESS FOR UPGRADING ORIENTED VINYL-
IDENE CHLORIDE POLYMER FILMS**
Glenn C. Wiggins, Russell L. Butler, and William R. R.
Park, Midland, and Harold J. Townsend, Saginaw,
Mich., assignors to The Dow Chemical Company, Midland, Mich., a corporation of Delaware
No Drawing. Filed Mar. 25, 1965, Ser. No. 442,826
7 Claims. (Cl. 264—130)

This invention relates to a process for upgrading oriented vinylidene chloride polymer films and to articles which are thereby obtained. More particularly, it relates to oriented vinylidene chloride polymer films which are coated with certain essentially amorphous vinylidene chloride resins to form composite, flexible, transparent film structures having enhanced heat-sealability, and barrier properties as well as improved slip and resistance to blocking.

Plastic films, such as those produced from oriented, normally crystalline vinylidene chloride polymers have found wide acceptance as packaging materials.

One of the problems associated with the fabrication of such films is the attainment of proper closures and seams for packages. Another problem is the tendency of such films to stick to one another due to electrostatic charges, or other cohesive forces resulting from their physical and chemical makeup, which makes the handling of such films extremely difficult. Because of such undesirable properties, the full sales potential of such films, as packaging materials, has not been realized. Various methods have been proposed and utilized for eliminating, or minimizing, the difficulties due to cohesion, with varying degrees of success. For example, one method relates to the use of certain agents which are added to the film material before extrusion, which agents tend to change the film surface to overcome blocking. The disadvantage of this method is that such agents may be deposited, or accumulated, on the dies or sizing devices, thus causing undesirable effects, such as marring of film surfaces, or actual ruptures thereof and, in addition, often results in an undesirable haziness and loss of film clarity and transparency. Another method involves dusting the surface of the film during production, with solid materials. It has been found, however, to be very difficult to apply the solid materials uniformly by mechanical means.

The method of the present invention not only provides a relatively simple and satisfactory solution to the problem of eliminating cohesive or blocking characteristics of oriented vinylidene chloride polymer films but, in addition, provides transparent film materials which may be easily heat-sealed by conventional means, for the attainment of closures and seams for packages made therefrom.

Briefly, the invention contemplates depositing a coating of an aqueous dispersion of an essentially amorphous polymer containing at least about 80 weight percent of vinylidene chloride in the polymer molecule and having a softening point of less than about 120° C. on the surface of an oriented vinylidene chloride polymer film having a residuum of an essentially water-soluble lubricating liquid thereon.

The basic method for producing oriented films from crystalline polymeric vinylidene chloride ( which term is intended herein to include the crystalline copolymers and interpolymers of vinylidene chloride) is set forth by Wiley in U.S. Patents 2,183,602; 2,233,442; and 2,348,772, and involves fusion of the polymer to melt the submicroscopic crystallites, supercooling the temporarily non-crystalline polymer; and cold-working as by stretching, to effect recrystallization in the direction of the stretching force. The application of such principles to the production of film from oriented vinylidene chloride polymers is described more fully by Stevenson in U.S. Patent 2,452,-080 and Trull in U.S. Patent 2,488,571 wherein the utilization of a predetermined head of a lubricating liquid is employed within a supercooled polymer tube to regulate the diameter and wall thickness of such tube and to lubricate its inner surfaces thereof prior to constricting the tube and stretching the same both radially and longitudinally to form an oriented crystalline polymeric film. It has been found that oriented films prepared in such manner have a residuum of lubricating liquid thereon. It has further been discovered (which discovery constitutes a portion of the present invention) that oriented polymeric films, as described by Stevenson and Trull, wherein the lubricating liquid employed is an essentially water-soluble liquid such as ethylene glycol and/or propylene glycol, are particularly useful when utilizing coatings of the nature as prescribed by the present invention.

The polymeric coatings employed in the invention are aqueous dispersions of an essentially amorphous polymer containing at least about 80 weight percent of vinylidene chloride in the polymer molecule and further characterized by having a softening point of less than about 120° C., and preferably between about 85° C. and 120° C.

Exemplary of polymeric materials useful in the present invention are interpolymers of (a) from 89–87 percent by weight of vinylidene chloride, (b) from 8–20 percent by weight of a monomer selected from the group consisting of methyl acrylate, methyl methacrylate, acrylonitrile, ethyl acrylate, and mixtures thereof, and (c) from 0–5 percent of a member selected from the group consisting of alkyl acrylates wherein the alkyl group contains from 2–22 carbon atoms, vinyl chloride, butadiene and mixtures thereof with the further limitation that the group of (c) be 3–22 carbon atoms when (b) is ethyl acrylate and that such copolymer shall show no appreciable change in the stress-strain relationship of a polymer film cast from a latex and stored at a temperature of between 0 and 50° C. The resultant polymer shall absorb less infra-red radiation at a wave length of 9.58 microns than at a wave length of 9.45 microns.

Exemplary of preferred polymeric materials to be employed as coatings of this nature are interpolymers of (a) about 80–87 weight percent vinylidene chloride, (b) from about 10 to 15 weight percent acrylonitrile and (c) from about 1 to 5 weight percent of an alkyl acrylate wherein the alkyl group contains from 2 to 22 carbon atoms, and still more particularly wherein the alkyl acrylate employed is 2-ethylhexyl acrylate.

The method of the invention comprises depositing upon the surface of the oriented, crystalline vinylidene chloride polymer film (having thereon a residuum of an essentially water-soluble lubricating liquid) a latex of the hereinbefore described polymeric composition and drying the coating by means of heat applied to the coating by conduction, radiation, or alternately a combination of conduction and radiation at a temperature sufficiently high to provide a continuous coating.

The polymeric aqueous dispersions for use in the practice of the present invention are readily prepared by conventional polymerization methods well known to the art wherein latexes or metastable dispersions of the polymer are obtained in an aqueous vehicle. Typically such latexes have particle sizes ranging from about 300 Angstroms to about 3000 Angstroms and a relatively low viscosity, that is, without the addition of thickeners, a latex containing 50 percent by weight polymer solids has a viscosity of less than about 10 centipoises.

The coating polymers which are operable in the present invention fall roughly into two categories, those that are relatively hard, and those that are less hard. The harder polymers include those containing the largest porion of vinylidene chloride, that is, ranging from about 34–87 percent, and the softer ones generally have from 80–84 percent vinylidene chloride. This hardness, however, may be modified in accordance with well known principles by selecting the suitable comonomers. The latexes employed in the present invention are not film forming at room temperature (about 25° C.).

The latexes in accordance with the invention may be formulated prior to coating in accordance with well known principles with such additives as are desired for the particular end use. Thus, dyes, pigments and fillers, may be incorporated within these latexes without destroying their essential characteristics. In coating the articles it is generally desirable to coat at a temperature between about 5 and 30° C. This may be accomplished by brushing, dipping, spraying, the use of transfer rolls, and other conventional well known means. After the article is coated, it is essential and critical that the coating remain wet until the temperature of the polymer particles has reached a film forming temperature. Thus, convection heating with dry air is unsatisfactory, as the water is evaporated and the particles cooled below their film forming temperatures and a dry, dusty, non-continuous coating results. The coatings are preferably fused and dried by means of radiant heat applied to either side of the substrate and/or conduction heat applied to the side of the substrate remote from the coating.

A combination of both techinques is readily and successfully employed. Thus, the water in the latex together with the resin particles are heated to a film forming temperature. The water may then leave as vapor and a smooth continuous coating results. Generally such coatings are dried at a temperature just below the temperature which the substrate will conveniently stand.

The coatings, when fused by means of radiant or conduction heating, that is, any heat source which is not a convection heat source, provides an excellent continuous coating.

By way of further illustration, a polymeric latex was prepared composed of 85 weight percent vinylidene chloride, 13 weight percent acrylonitrile and 2 weight percent 2-ethylhexylacrylate and formulated with 1 percent by weight based on latex solids of isooctylphenylpolyethoxyethanol as a surfactant.

The resultant latex contained about 50 weight percent solids. Portions of the latex are dried by radiant heat to form a 2 mil thick film which is employed for evaluation purposes. A portion of the film is examined using an infrared spectroscope and the absorption at 9.58 microns and at 9.45 microns. The X-ray scattering indicates no crystallinity of the samples. Portions of the samples are stored at a temperature of 50° C. for 6 months at 50 percent relative humidity and re-examined by infrared and X-ray technique. No change is observed. Stress-strain curves are also generated on samples of film both before and after storage and no change is observed.

A portion of the remainder of the latex was then cast as a wet film at a thickness sufficient to provide a dry coating of 0.1 mil thickness onto a pre-formed 1 mil thick oriented vinylidene chloride copolymer film composed of about 85 weight vinylidene chloride and complementarily about 15 weight percent vinyl chloride as prepared by a process essentially as described in U.S. 2,452,080 using propylene glycol as the lubricating liquid in the supercooled polymer tube. The coated film was dried by passing the same through a radiant heat oven for a sufficient length of time to form a continuous adherent coating without causing the oriented vinylidene chloride polymer film to shrink or deorient. The resultant coating was adherent and transparent and the so-formed coated film was readily heat-sealable at temperatures ranging as low as about 85° C. using conventional heat-sealing equipment, and, in addition, exhibited significantly improved slip as well as block-resistant properties when compared to equivalent non-coated oriented vinylidene chloride polymer films.

What is claimed is:

1. A method for the production of readily heat-sealable, transparent, non-blocking composite film-like structures which comprises (1) depositing a coating of an aqueous dispersion of an essentially amorphous polymer containing at least about 80 weight percent of vinylidene chloride in the polymer molecule and having a softening point of less than about 120° C., on the surface of an oriented crystalline vinylidene chloride polymer film having a residuum of an essentially water soluble lubricating liquid selected from the group consisting of ethylene glycol and propylene glycol thereon, then (2) drying said coating by heating means to form a continuous, adherent coating on said oriented crystalline vinylidene chloride polymer film.

2. The process of claim 1 wherein said coating is provided in sufficient quantity to provide a dry coating having a thickness of about 1/10 of a mil.

3. The process of claim 1 wherein said essentially amorphous vinylidene chloride polymer is an interpolymer of vinylidene chloride, acrylonitrile and an alkyl acrylate wherein the alkyl group contains from 2 to 22 carbon atoms.

4. The process of claim 3 wherein said interpolymer is composed of 85 parts of vinylidene chloride, 13 parts of acrylonitrile and 2 parts of 2-ethylhexylacrylate.

5. The process of claim 1 wherein said oriented, crystalline vinylidene chloride polymer is prepared by fusing said polymer and extruding the same in tubular form downwardly into a supercooling bath while maintaining a predetermined head of an essentially water-soluble lubricating liquid selected from the group consisting of ethylene glycol and propylene glycol within the tube to regulate the diameter and wall thickness of the suprecooled tube and to lubricate its inner surface, constricting said tube after supercooling and then stretching said tube both radially and longitudinally to form an oriented crystalline film.

6. The process of claim 1 wherein said heating means is radiation means.

7. The process of claim 1 wherein said heating means is conduction means.

References Cited

UNITED STATES PATENTS 3,002,543 2/1962 Baird _____ 264—22
3,108,017 10/1963 Messwarb _____ 117—38.8

ROBERT F. WHITE, *Primary Examiner.*

R. B. MOFFITT, *Assistant Examiner.*